US008400288B2

(12) United States Patent
Bowden et al.

(10) Patent No.: US 8,400,288 B2
(45) Date of Patent: Mar. 19, 2013

(54) HIDDEN OFFSET POINTER OVER RECONFIGURABLE DISPLAY

(75) Inventors: Upton Beall Bowden, Canton, MI (US); James P. Farell, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 470 days.

(21) Appl. No.: 12/702,521

(22) Filed: Feb. 9, 2010

(65) Prior Publication Data

US 2011/0193694 A1 Aug. 11, 2011

(51) Int. Cl.
*G08B 5/00* (2006.01)
*G09F 9/00* (2006.01)
*B60Q 1/00* (2006.01)
*G01D 11/28* (2006.01)
*G01D 13/22* (2006.01)

(52) U.S. Cl. ............... 340/438; 340/815.4; 340/461; 340/462; 116/288; 116/300

(58) Field of Classification Search .................. None
See application file for complete search history.

(56) References Cited

U.S. PATENT DOCUMENTS

| 3,300,572 | A | | 1/1967 | Dahlgren et al. |
| 5,211,128 | A | | 5/1993 | Katoh et al. |
| 5,295,049 | A | * | 3/1994 | Terada ............................ 362/27 |
| 5,372,087 | A | | 12/1994 | Kato et al. |
| 5,578,985 | A | * | 11/1996 | Cremers et al. ............... 340/461 |
| 5,630,373 | A | | 5/1997 | Kato et al. |
| 5,636,589 | A | | 6/1997 | Kato et al. |
| 5,747,743 | A | | 5/1998 | Kato et al. |
| 5,806,954 | A | | 9/1998 | Butt et al. |
| 6,082,288 | A | | 7/2000 | Kato et al. |
| 6,314,908 | B1 | | 11/2001 | Olbrich et al. |
| 6,408,783 | B1 | | 6/2002 | Ludewig |
| 6,490,992 | B2 | | 12/2002 | Olbrich et al. |
| 6,601,532 | B1 | * | 8/2003 | Olbrich .......................... 116/288 |
| 6,606,961 | B1 | * | 8/2003 | Noll et al. ..................... 116/288 |
| 7,159,534 | B2 | * | 1/2007 | Tanaka et al. ................ 116/300 |
| 7,520,241 | B2 | | 4/2009 | Pala et al. |
| 2007/0069880 | A1 | * | 3/2007 | Best et al. ..................... 340/461 |
| 2007/0157745 | A1 | * | 7/2007 | Takato et al. ................ 73/866.3 |
| 2007/0279243 | A1 | * | 12/2007 | Araki et al. .............. 340/815.58 |
| 2008/0178792 | A1 | * | 7/2008 | Pala et al. ..................... 116/288 |
| 2008/0309475 | A1 | * | 12/2008 | Kuno et al. ................... 340/462 |
| 2010/0321176 | A1 | * | 12/2010 | Hofmann et al. ............ 340/438 |

FOREIGN PATENT DOCUMENTS

| DE | 4315027 A1 | 6/1994 |
| DE | 4321146 A1 | 1/1995 |
| DE | 19733650 A1 | 2/1999 |
| DE | 19757564 A1 | 7/1999 |
| DE | 10131264 A1 | 9/2002 |
| EP | 811827 A1 | 12/1997 |
| JP | 2002357462 A | 12/2002 |

* cited by examiner

*Primary Examiner* — Jennifer Mehmood
*Assistant Examiner* — Fekadeselassie Girma
(74) *Attorney, Agent, or Firm* — Dickinson Wright PLLC

(57) ABSTRACT

An operator configurable vehicle instrument panel with the ability to provide both analog and digital style outputs, and more particularly to an instrument panel configured to provide a digital style display in a first state and an analog state display in a second state using a physical pointer that was not visible in the first state.

22 Claims, 3 Drawing Sheets

HIDDEN OFFSET POINTER OVER RECONFIGURABLE DISPLAY

BACKGROUND OF THE INVENTION

1. Technical Field

The present invention is directed to an operator configurable vehicle instrument panel with the ability to provide both analog and digital visual style outputs, and more particularly to an instrument panel configured to provide a digital style display in a first state and an analog style display in a second state, using a physical pointer in the second state that was not visible in the first state.

2. Discussion

Vehicle manufacturers continually strive to differentiate vehicles in the market place by providing unique styling and aesthetic features. As part of this differentiation, many manufacturers attempt to provide a unique cockpit look and feel for the operator of the vehicle. As part of this unique look and feel, each vehicle manufacturer attempts to have a different appearance to the instrument panel and gauges; however, manufacturers have been limited in differentiating instrument panels and gauges by the types, sizes and requirements that are available for producing a visually attractive appearance that also efficiently provides information to the operator of the vehicle in a clear, concise manner. In addition most instrument panels and in particular most gauges generally have limited available space for customization and the amount of space required for each pointer of the gauge sweeping about its rotational axis and in particular for speedometer pointers also limited available design options. In addition, designers have been limited to either a digital gauge or an analog gauge, which did not allow operators to pick their described preference.

Traditionally, instrument panels and gauges were backlighted, which limited the number of design options for instrument panels. The pointers also were generally located above the surface plate of the instrument panel with the axis of the pointer being located approximately in the center of the gauge with a fixed and nonchangeable display underneath. At most, a small LCD window was located in a blank area of the gauge that provided scrolling or selectable content such as vehicle information, trip odometer, odometer, direction of travel, clock and other information useful to the operator of the vehicle. However, the main gauges such as speed, rpm and others were always static and were not able to be customized by the user, while maintaining analog style pointers.

SUMMARY OF THE INVENTION

The present invention is directed to an operator configurable vehicle instrument panel with the ability to provide both analog and digital style outputs, and more particularly to an instrument panel configured to provide a digital style display in a first state and an analog style display in a second state using a physical pointer that was not visible in the first state.

The instrument panel generally includes a visible surface which is digitally rendered, such as by an LCD, e-ink or OLED display. The display allows customization by the user, such as selecting different styles or skins for appearances. These styles or skins may be completely digital or incorporate physical pointers with the backplate digital display providing the normal indicia for the physical pointers. Unlike prior instrument panels and gauges, the pointers in the present invention are capable of being hidden from view of the user and do not have an axis of rotation passing through the visible portion of the backplate display.

As vehicles add functionality and additional electronic devices and sensors, many manufacturers have been constrained by limited display space in the gaze-forward position. In addition, many manufacturers have been constrained in displaying new types of information not previously found in vehicles, especially in the gaze-forward position. Manufacturers and designers strive to maximize the amount of information that may be clearly communicated to the vehicle operator in the gaze-forward position. The gaze-forward position generally refers to the area approximately in view of the operator as they gaze through the windshield in the direction of travel. Traditionally, the instrument cluster or instrument panel substantially behind the steering wheel is in the gaze-forward position. Therefore, manufacturers and designers desire to clearly communicate without confusion as much information as possible in this limited display area. In addition, manufacturers desire to allow consumers to configure the display in this gaze-forward position such that the display communicates efficiently the information desired by the operator of the vehicle. In addition, customers were not able to customize the look and feel of gauges, and in particular, were not able to select which gauges to include or customize the arrangement or style of the gauges.

Almost all gauges, whether independent gauges or gauges within an instrument panel or cluster, include a pointer or needle that is mounted on a pin or shaft that extends through the backplate forming the display surface of the central display of the gauge. The pointer on these prior art gauges generally rotated about an axis of a shaft to point to various painted indicia. As the pointer was generally located at any radial point, the central display area across which the pointer swept only allowed for limited unobstructive functionality. In addition, the backplate with its indicia for the pointer was static and not able to be customized or changed by the user, and the user was not able to select which gauges to view.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention is generally directed to a customizable instrument panel 10, exemplarily illustrated in the Figures. The instrument panel 10, and digitally displayed gauges 18 as well as digitally produced indicia 36 are only exemplary illustrations and each may be formed in any desired style, shape, size or configuration. In addition, the present invention is particularly unique, as the style and configuration is intended to be customized by the end-user, such as an operator of a vehicle. It is important to note that the present invention allows a high degree of customization not previously possible.

Figure 1:
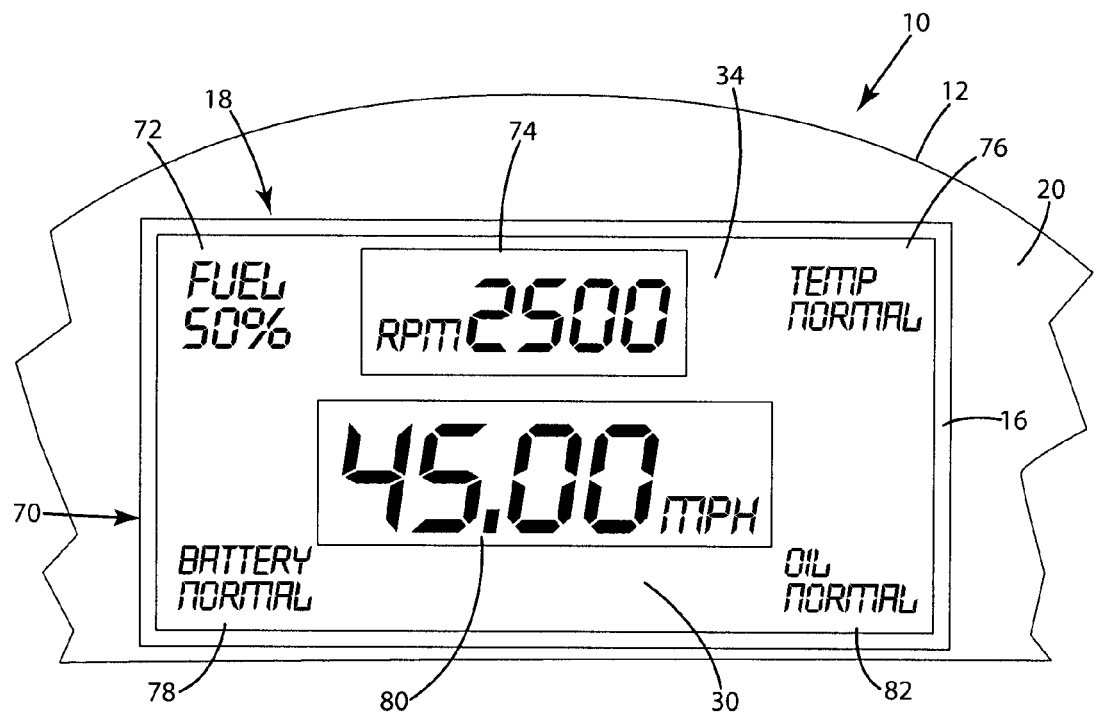
FIG. 1 is a front view of an exemplary instrument panel in an exemplary full digital style mode.

As used herein, the term instrument panel 10 generally refers to an instrument panel 10 including multiple gauges, but one skilled in the art would recognize that the present invention may have only a single gauge 18, the style, selection of output, or configuration thereof being customizable by the user. Also, as the gauges 18 in the present invention are digitally rendered, the instrument panel may include any type of gauge, so long as the relevant information can be provided to the instrument panel. As further used herein, analog style refers to a configuration wherein the gauge 18 incorporates a physical pointer 42 over a digitally displayed background and digitally produced indicia 36 providing markings for the pointer 42. Digital style refers to digitally-produced gauge where the analog style or physical pointer is not used. Of course, the present invention may have an instrument panel 10 that includes both digital style and analog style gauges 18. Analog style gauges 50 are clearly illustrated in FIG. 2 and digital style gauges 70 are illustrated in FIG. 1.

As illustrated in the Figures, the instrument panel 10 generally includes a housing 12 in which the gauge(s) 18 are arranged. The gauge(s) 18 generally include a backplate 20 with a digital display 30, and a pointer assembly 40 having a pointer 42 that is capable of extending outward over the digital display 30 to point to digital indicia 36 provided by the digital display 30.

The housing 12 may be formed in any style, shape, size and configuration and is generally adaptable to fit mechanically and aesthetically with the other interior components and with the desired location. Although not illustrated, the housing in some circumstances may be formed from any desired portion of a vehicle dashboard. The housing 12 also may be hidden from the operator view (not illustrated). In other embodiments, the housing 12 may include a trim cover or border 16, which is visible to the operator of the vehicle, as illustrated in the Figures.

The trim cover 16 may be formed from any desirable material in any style, shape, size or configuration. The purpose of the trim cover 16 is to allow the pointer assembly 40 to remain hidden, including hiding from view the pointer 42. Of course, the trim cover 16 in some embodiments may be integrally formed with the housing 12 or backplate 20 or in some embodiments, the trim cover may not exist due to the configuration of the backplate 20 or housing 12 which can hide the pointer assembly 40 from view without the need for a trim.

The backplate 20 is secured within the housing 12 or as further illustrated in the Figures, secured within the trim cover 16. The backplate 20 may extend across multiple gauges 18, including multiple displays 30, a combination of traditional gauges and at least one display 30 or a single gauge 18 with a single display 30. In some circumstances, a single or multiple display 30 may be located in the backplate 20, and in other circumstances, the display 30 can form a substantial portion or all of the backplate 20. More specifically, the display 30 can be the backplate 20. Although not illustrated, the trim cover 16 may be around the display 30 located on the backplate 20 or the backplate 20 may form the trim cover with the display 30 recessed. When the display 30 forms the backplate 20, it extends slightly under the trim cover 16.

The present invention is described below with a single gauge 18 formed from the display 30. The display 30 may be any display 30 configured to provide the relevant information on a display surface 34, including the digital indicia 36. The display 30 has an outer circumferential edge 32 having an outer circumference. The display 30 may be coupled into the instrument panel 12 by any known method. The display 30 may be any type of display, such as an LCD, OLED or e-ink display.

Figure 2:
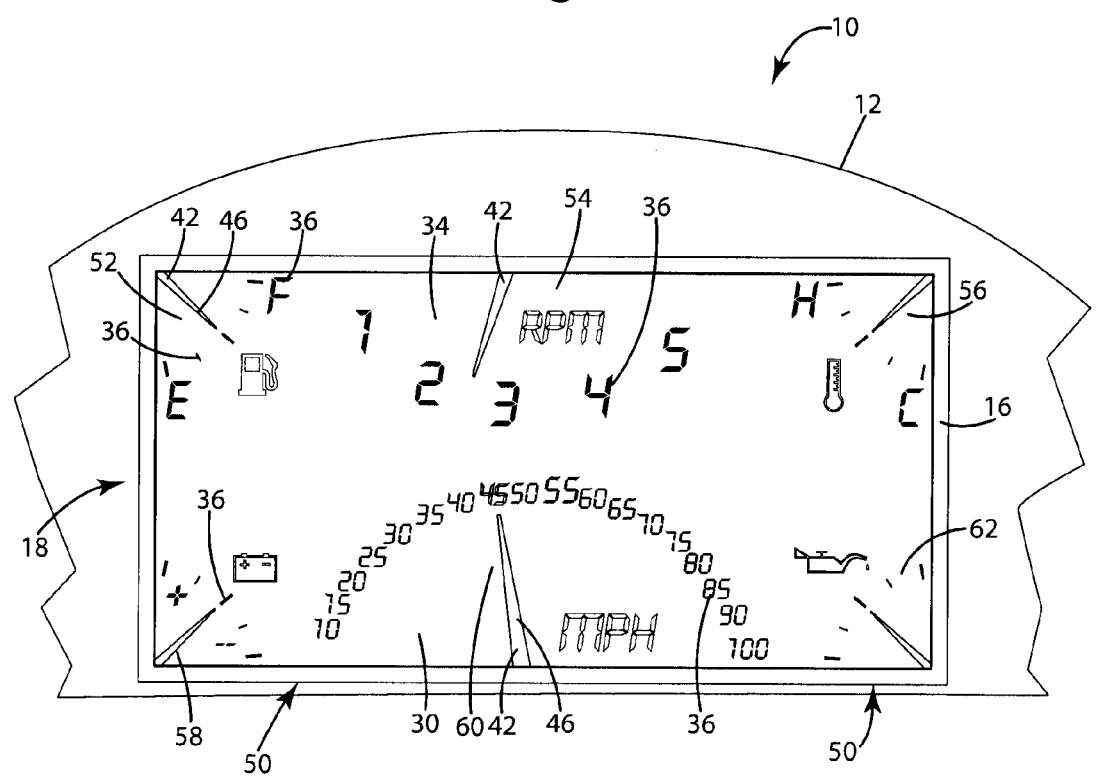
FIG. 2 is a front view of the instrument panel of FIG. 1 in an exemplary full analog style mode with the indicia and gauge styles being provided by the digital display.
Figure 3:
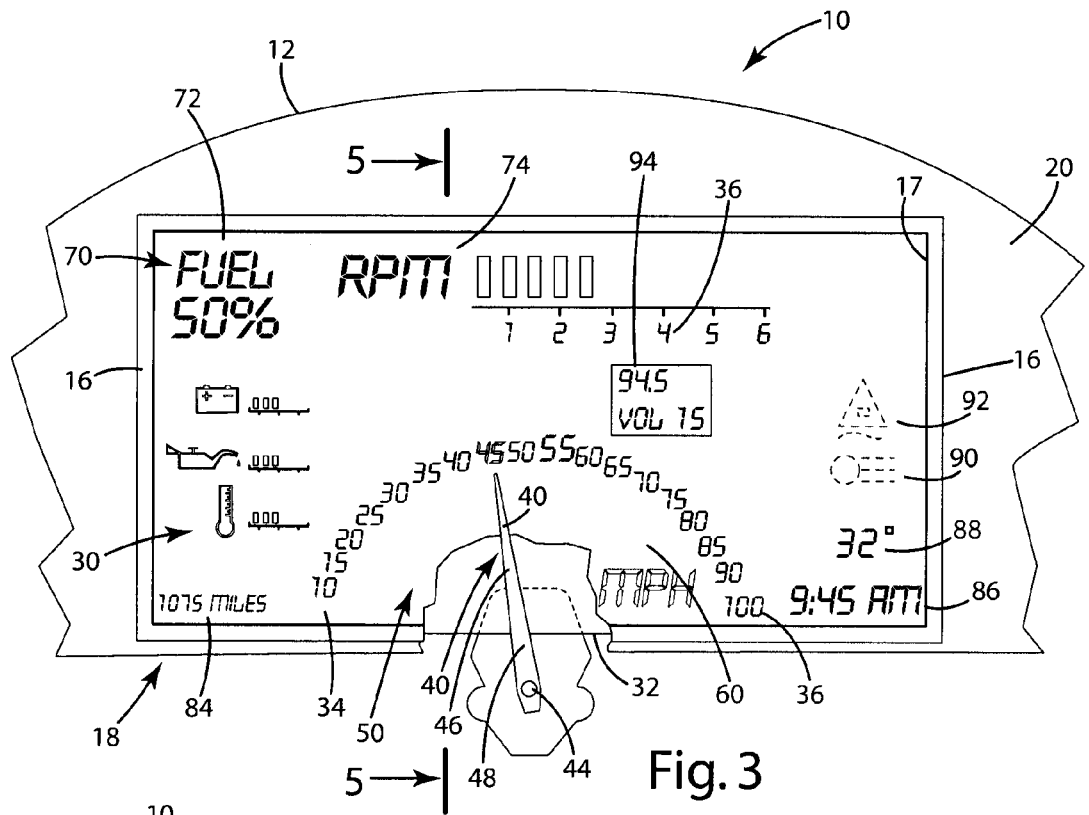
FIG. 3 is a partial cut-away view of an exemplary instrument panel with the digital display of the present invention showing the location of a single pointer.
Figure 4:
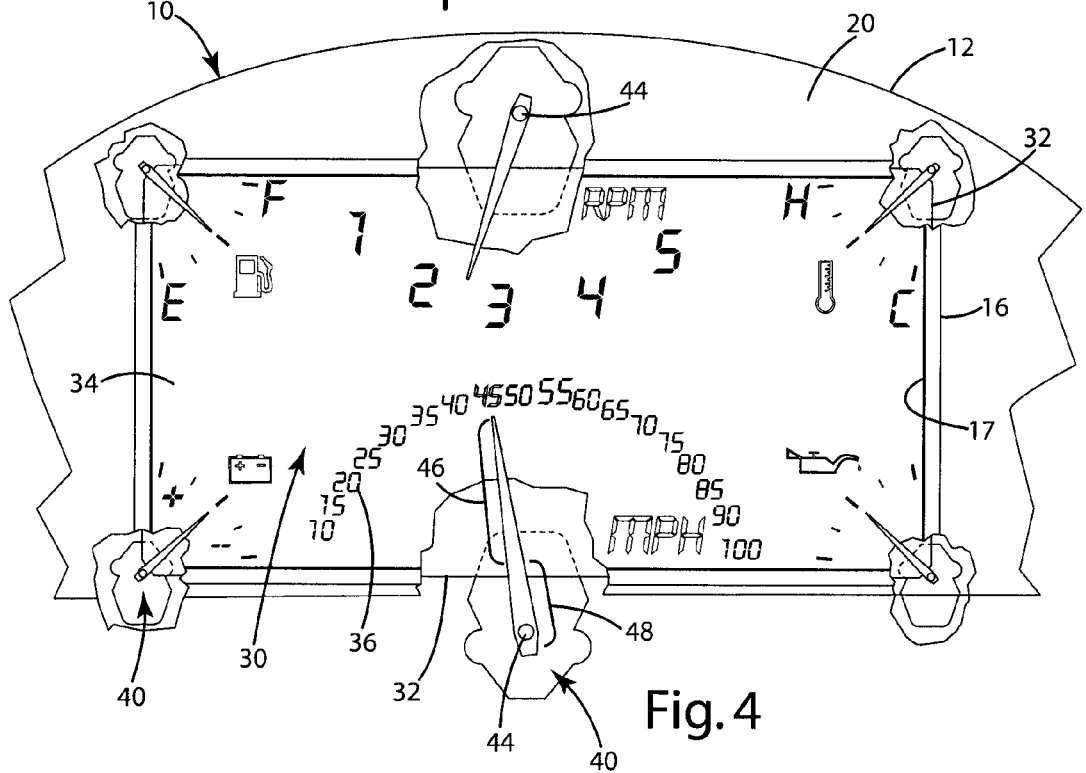
FIG. 4 is a partial cut-away view of an exemplary instrument panel with the digital display of the present invention showing the locations of multiple pointers of different sizes.
Figure 5:
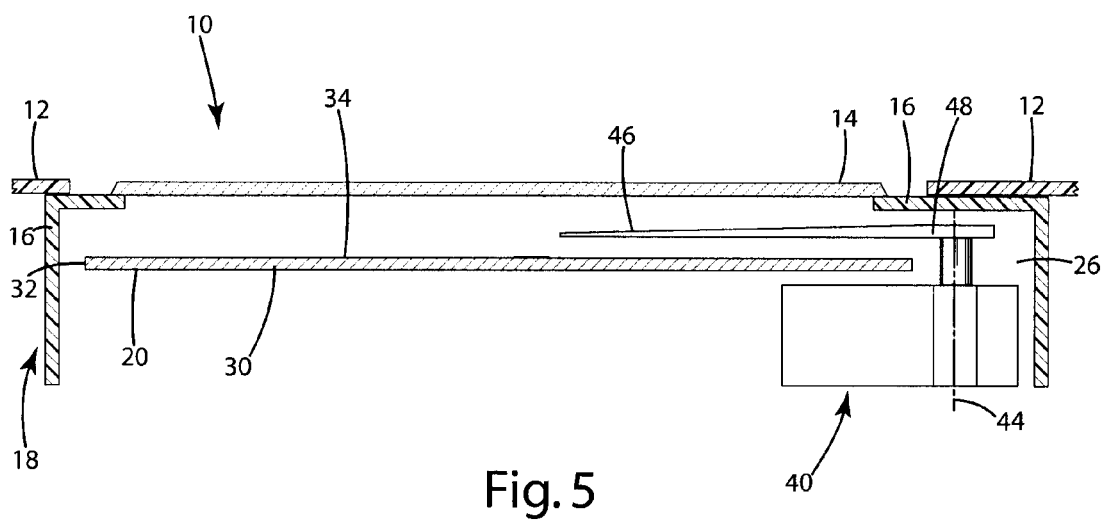
FIG. 5 is a partial sectional view of the instrument panel in FIG. 3 along lines 5-5.

The instrument panel 10, specifically the gauge 18, further includes at least one pointer assembly 40. The pointer assembly 40 generally includes a pointer 42 rotatable about an axis 44 and extending longitudinally from the axis, the majority of which forms a visible portion 46, with the rest forming a hidden portion 48. The axis of rotation 44 is within the hidden portion 48. The gauge 18 may include a single pointer assembly 40 as illustrated in FIGS. 3 and 5, or multiple pointer assemblies 40 as illustrated in FIGS. 2 and 4. The pointers 42 may vary in size as illustrated in FIGS. 2 and 4. The locations of the pointer assemblies 40 may be varied as desired, however, the axis of the pointer 42 is adjacent to the display surface 34 and does not pass through the visible portions of the display surfaces 34. The pointer assembly is also generally located in a cavity 26 formed by the display, trim cover, and backplate, with the ability of the pointer 42 to extend over the display 30 or retract behind the trim cover 16.

The display 30 can provide digital style gauges 70 as illustrated in FIG. 2, or analog style gauges 50 as illustrated in FIGS. 2 and 4, or a combination of them as illustrated in FIG. 3. As illustrated in FIG. 1, the digital display 30 on the display surface 34 can include a digital gas gauge 72, digital rpm gauge 74, digital temperature gauge 76, digital battery gauge 78, digital speedometer gauge 80, digital oil pressure gauge 82. As further illustrated in FIG. 2, the display may output digital indicia 36 and related graphics for the gauges onto the display surface, in combination with a pointer assembly 40 forming an analog style gauge 50. The analog style gauges 50 illustrated in FIG. 2, include an analog style age gauge 52, an analog style rpm gauge 54, an analog style temperature gauge 56, an analog style battery gauge 58, an analog style speedometer 60 and an analog style pressure gauge 62.

Other exemplary gauges or information displays may include an odometer 84, clock 86, outside temperature 88 and a radio information area 94 as illustrated in FIG. 3. Also illustrated in phantom lines in FIG. 3 is a traction control warning 92 and bright lights status 90.

During operation, the pointer 42 may be configured to be positioned out of view behind the trim cover 16. This allows the gauges to provide, if desired, clean unobstructed digital gauges, yet if desired, provide a pointer 42 to point to digitally produced indicia to create an analog style gauge.

The present invention provides the possibility for the user to customize both the digital style gauge as well as the analog style gauges and selected combinations of various analog and digital styled gauges. This customization on the fly of what gauges to display whether to display analog or digital style versions and the look and feel or applied skin for the gauges has not be previously available.

It is expected that the user or operator may download additional content regarding styles and in some instances create their own graphical representation of gauges.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An instrument panel comprising:
    an outer housing;
    a backplate located within said housing;
    a digital display having a circumferential edge and a display surface, said digital display forming at least a portion of said backplate and wherein said digital display is at least partially surrounded by a trim cover and wherein said trim cover is displaced from said circumferential edge and said display surface; and
    a pointer assembly having a pointer located between said digital display and said trim cover and wherein said pointer moves between a hidden position and a visible position and wherein in said hidden position, the pointer does not extend visibly over said display and in said visible position, said pointer extends visibly over said display.

2. The instrument panel of claim 1 wherein said trim cover forms a portion of said outer housing.

3. The instrument panel of claim 2 further including a transparent cover extending over said display and bounded by said trim cover.

4. The instrument panel of claim 1 wherein said digital display forms substantially all of said backplate.

5. The instrument panel of claim 1 wherein said digital display provides digital analog style indicia for said pointer when said pointer is in said visible position.

6. The instrument panel of claim 1 wherein said digital display is free of said digital analog style indicia for said pointer when said pointer is in said hidden position.

7. The instrument panel of claim 1 wherein said digital display selected from one of the group consisting of an LCD display, an e-ink display, and an OLED display.

8. The instrument panel of claim 1 wherein said display backlights, said pointer and said trim cover are free of additional light sources.

9. The instrument panel of claim 8 wherein said pointer is lighted.

10. The instrument panel of claim 1 wherein said digital display includes an outer circumference which is greater than an inner circumference of said trim cover.

11. The instrument panel of claim 1 wherein said pointer rotates about an axis and said axis does not pass through said display.

12. The instrument panel of claim 1 wherein said axis is spaced from said circumferential edge.

13. The instrument panel of claim 1 wherein said pointer rotates over the surface of said display in said visible position.

14. The instrument panel of claim 13 wherein the pointer is substantially aligned with said circumferential edge in said hidden position.

15. The instrument panel of claim 1 including a plurality of pointers, each moveable between a hidden position and a visible position.

16. An instrument panel comprising:
    an outer housing;
    a backplate located within said housing;
    a digital display having a circumferential edge and a display surface, said digital display being recessed from said backplate and wherein said backplate overlaps at least the circumferential edge of said digital display; and
    a pointer assembly having a pointer located between said digital display and said backplate and wherein said pointer moves between a hidden position and a visible position and wherein in said hidden position, the pointer does not extend visibly over said display and in said visible position, said pointer extends visibly over said display.

17. The instrument panel of claim 16 further including a transparent cover extending over said display and bounded by said outer housing.

18. The instrument panel of claim 16 wherein said digital display provides digital analog style indicia for said pointer when said pointer is in said visible position and wherein said digital display is free of said digital analog style indicia for said pointer when said pointer is in said hidden position.

19. The instrument panel of claim 16 wherein said backplate defines an opening above said recessed display and wherein said opening has an inner circumference and wherein said digital display includes an outer circumference which is greater than said inner circumference of said backplate.

20. The instrument panel of claim 16 wherein said pointer rotates about an axis and said axis does not pass through said display.

21. The instrument panel of claim 20 wherein said pointer rotates about an axis and said axis, if extended beyond said pointer passes through said backplate.

22. The instrument panel of claim 1 wherein said axis is spaced from said circumferential edge.

* * * * *